United States Patent
Meng et al.

(10) Patent No.: US 12,400,125 B2
(45) Date of Patent: Aug. 26, 2025

(54) LEARNING TASK COMPILING METHOD OF ARTIFICIAL INTELLIGENCE PROCESSOR AND RELATED PRODUCTS

(71) Applicant: Cambricon Technologies Corporation Limited, Beijing (CN)

(72) Inventors: Xiaofu Meng, Beijing (CN); Hanzhao Zhu, Beijing (CN); Shaoli Liu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 906 days.

(21) Appl. No.: 16/719,662

(22) Filed: Dec. 18, 2019

(65) Prior Publication Data
US 2021/0182682 A1    Jun. 17, 2021

(30) Foreign Application Priority Data

| Dec. 17, 2019 | (CN) | 201811639927.4 |
| Dec. 17, 2019 | (CN) | 201811640027.1 |
| Dec. 17, 2019 | (CN) | 201811640762.2 |
| Dec. 17, 2019 | (CN) | 201911296834.0 |

(51) Int. Cl.
*G06N 3/10*     (2006.01)
*G06F 18/25*    (2023.01)
*G06N 3/063*    (2023.01)
*G06N 3/082*    (2023.01)
(Continued)

(52) U.S. Cl.
CPC .............. *G06N 3/10* (2013.01); *G06F 18/251* (2023.01); *G06N 3/063* (2013.01); *G06N 3/082* (2013.01); *G06N 5/046* (2013.01); *G06N 20/00* (2019.01)

(58) Field of Classification Search
CPC .......... G06N 3/10; G06N 20/00; G06N 3/063; G06N 3/082; G06N 5/046; G06F 18/251
See application file for complete search history.

(56) References Cited

FOREIGN PATENT DOCUMENTS

| CN | 108009634 A | 5/2018 |
| CN | 108701250 A | 10/2018 |
| CN | 108710535 A | 10/2018 |

(Continued)

OTHER PUBLICATIONS

Krishnamoorthi, R., Quantizing deep convolutional networks for efficient inference: A whitepaper, [retrieved Feb. 10, 2023]. Retrieved from Internet:<https://arxiv.org/abs/1806.08342> (Year: 2018).*

(Continued)

*Primary Examiner* — Miranda M Huang
*Assistant Examiner* — Bart I Rylander
(74) *Attorney, Agent, or Firm* — Getech Law LLC; Jun Ye

(57) ABSTRACT

The present disclosure relates to a learning task compiling method of artificial intelligence processors and related products. The learning task compiling method of artificial intelligence processors includes fusing a redundant neural network layer to a convolution layer, optimizing a structure of a convolution neural network, and compiling a learning task of an artificial intelligence processor based on the optimized convolution neural network. The method may achieve high efficiency for learning task compiling of artificial intelligence processors, and may reduce data exchange during processing when being executed on a device.

5 Claims, 8 Drawing Sheets

(51) Int. Cl.
*G06N 5/046* (2023.01)
*G06N 20/00* (2019.01)

(56) References Cited

FOREIGN PATENT DOCUMENTS

| CN | 109034371 | A |   | 12/2018 |           |
|----|-----------|---|---|---------|-----------|
| CN | 109766996 | A |   | 5/2019  |           |
| KR | 20190098106 | A | * | 8/2019 | G06N 3/084 |

OTHER PUBLICATIONS

Ioffe, et al, Batch Normalization: Accelerating Deep Network Training by Reducing Internal Covariate Shift, [retrieved Feb. 10, 2023]. Retrieved from Internet:<http://proceedings.mlr.press/v37/ioffe15.html> (Year: 2015).*

Ioffe, S., Batch Renormalization: Towards Reducing Minibatch Dependence in Batch-Normalized Models, [retrieved Feb. 10, 2023]. Retrieved from Internet:<https://proceedings.neurips.cc/paper/2017/hash/c54e7837e0cd0ced286cb5995327d1ab-Abstract.html> (Year: 2017).*

Jacob, et al, Quantization and Training of Neural Networks for Efficient Integer-Arithmetic-Only Inference, [retrieved on Feb. 10, 2023]. Retrieved from Internet:<https://openaccess.thecvf.com/content_cvpr_2018/html/Jacob_Quantization_and_Training_CVPR_2018_paper.html> (Year: 2018).*

Yonekawa, H., et al, On-Chip Memory Based Binarized Convolutional Deep Neural Network Applying Batch Normalization Free Technique on an FPGA, [retrieved on Feb. 10, 2023]. Retrieved from Internet:< https://ieeexplore.ieee.org/abstract/document/7965031> (Year: 2017).*

Deepvisionconsulting, "From Keras to Caffe", [received on Sep. 8, 2023]. Retrieved from Internet:<https://www.deepvisionconsluting.com/from-keras-to-caffe/> (Year: 2017).*

Li, et al, Adaptive Batch Normalization for practical domain adaptation, [received Nov. 26, 2024], retrieved from Internet:<https://www.sciencedirect.com/science/article/pii/S003132031830092X>(Year: 2018).*

Li et al., "Introduction to Neural Networks and Neural Computers", Oct. 31, 1995, 4 pages. (With Brief English Explanation).

CN201911296833.6-First Office Action mailed on Sep. 16, 2020, 15 pages.

CN201911296833.6-Second Office Action mailed on Dec. 21, 2020, 19 Pages.

CN201911296834.0-First Office Action mailed on Aug. 14, 2020, 24 pages.

CN201911296834.0-Second Office Action mailed on Nov. 9, 2020, 20 pages.

CN201911296837.4-First Office Action mailed on Aug. 7, 2020, 21 pages.

Li et al., "Introduction to Neural Networks abd Neural Computers", Oct. 31, 1995, 4 pages. (With Brief English Explanation).

* cited by examiner

LEARNING TASK COMPILING METHOD OF ARTIFICIAL INTELLIGENCE PROCESSOR AND RELATED PRODUCTS

RELATED APPLICATION

The present application claims the benefit and priority of Chinese Patent Application No. 201811640027.1, with the title of "Convolutional Neural Network Optimization Method, Device, Storage Medium and System" filed on Dec. 29, 2018.

The present application claims the benefit and priority of Chinese Patent Application No. 201811640762.2, with the title of "Convolutional Neural Network Optimization Method, Device, Storage Medium and System" filed on Dec. 29, 2018.

The present application claims the benefit and priority of Chinese Patent Application No. 201811639927.4, with the title of "Convolutional Neural Network Optimization Method, Device, Storage Medium and System" filed on Dec. 29, 2018.

TECHNICAL FIELD

The present disclosure relates to the field of artificial intelligence, and in particular relates to a learning task compiling method of artificial intelligence processors and related products.

BACKGROUND

When an artificial intelligence processor runs a neural network, the artificial intelligence processor often employs a general purpose processor (CPU) to compile the neural network which includes neural network operators to obtain an executable file. The executable file contains device information indicating a device in a heterogeneous computer system on which the executable file requires to be executed. After the executable file is assembled and linked, an executable program of neural network is obtained and stored.

CPU may read the executable program from the position where the program is stored, and obtain a plurality of tasks of the program according to the executable program. The plurality of tasks are distributed to the artificial intelligence processor for execution, then operation results can be obtained.

A neural network usually includes a large number of operators. When an artificial intelligence processor performs operation logic of those operators, the processor normally performs the following steps:

reading an operation result of a previous operator from an off-chip cache, performing an operation task of a current operator based on the operation result of the previous operator, and writing an operation result of the current operation task in the off-chip cache after completing the operation task of the current operator. In this way, when a device performs operation tasks of a neural network, the device has to perform data exchange every time after completing operations of an operator. This may reduce data processing efficiency as well as occupy inter-chip communication resources.

SUMMARY

In view of the situation above, it is necessary to provide a learning task compiling method of artificial intelligence processors and related products to overcome the technical problems.

The present disclosure provides a learning task compiling method of artificial intelligence processors. The method includes:

obtaining, by a general purpose processor, configuration parameters, where the configuration parameters include first training parameters and second training parameters of a batch norm layer;

fusing, by the general purpose processor, the first training parameters of the batch norm layer and weight parameters of a convolution layer of a convolution neural network to obtain a first fusion result;

fusing, by the general purpose processor, the second training parameters of the batch norm layer and bias parameters of the convolution layer of the convolution neural network to obtain a second fusion result;

optimizing, by the general purpose processor, the convolution neural network to obtain an optimized convolution neural network according to the first fusion result and the second fusion result; and compiling the optimized convolution neural network to obtain a corresponding binary instruction sequence, and distributing the binary instruction sequence to the artificial intelligence processor for executing corresponding learning tasks.

In an example, fusing the first training parameters of the batch norm layer and the weight parameters of the convolution layer to obtain the first fusion result includes:

multiplying, by the general purpose processor, the first training parameters of the batch norm layer by the weight parameters of the convolution layer to obtain the first fusion result.

In an example, fusing the second training parameters of the batch norm layer and the bias parameters of the convolution layer of the convolution neural network to obtain the second fusion result includes:

adding, by the general purpose processor, the second training parameters of the batch norm layer and the bias parameters of the convolution layer to obtain the second fusion result.

In an example, the optimizing the convolution neural network according to the first fusion result and the second fusion result includes:

deleting, by the general purpose processor, the batch norm layer, changing the weight parameters of the convolution layer to the first fusion result, and changing the bias parameters of the convolution layer to the second fusion result.

In an example, the method includes performing, by the general purpose processor, convolution computations on input data of the convolution layer and the first fusion result, and on the input data of the convolution layer and the second fusion result to obtain an output result of the convolution layer.

In an example, the performing convolution computations on the input data of the convolution layer and the first fusion result, and on the input data of the convolution layer and the second fusion result to obtain the output result of the convolution layer includes:

multiplying, by the general purpose processor, the input data by the first fusion result to obtain a first operation result; and adding, by the general purpose processor, the first operation result and the second fusion result to obtain the output result.

In an example, the first training parameters of the batch norm layer include at least one first training sub-parameter for performing convolution computations of the batch norm layer. The second training parameters of the batch norm layer include at least one second training sub-parameter for performing the convolution computations of the batch norm layer.

In an example, if the first training parameters of the batch norm layer include a plurality of first training sub-parameters, the method includes performing, by the general purpose processor, computations according to the plurality of first training sub-parameters to obtain a first intermediate operation result; and fusing, by the general purpose processor, the first intermediate operation result, the first training parameters of a scale layer, and the weight parameters of the convolution layer to obtain the first fusion result.

In an example, if the second training parameters of the batch norm layer include a plurality of second training sub-parameters, the method includes performing, by the general purpose processor, computations according to the plurality of second training sub-parameters to obtain a second intermediate operation result; and fusing, by the general purpose processor, the second intermediate operation result, the second training parameters of a scale layer, and the bias parameters of the convolution layer to obtain the second fusion result.

The present disclosure provides a learning task compiling system of artificial intelligence processors. The system includes a memory, a processor, and a computer program which is stored in the memory and can run on the processor. The processor may implement the steps of any of the methods above when the processor executes the computer program.

The present disclosure provides a computer readable storage medium. A computer program is stored in the computer readable storage medium. The computer program may implement the steps of any of the methods above when a processor executes the computer program.

The present technical scheme includes first deleting a redundant neural network layer in a convolution neural network to simplify the neural network, and then compiling the simplified convolution network structure. In the optimized neural network, since the batch norm layer and/or the scale layer is fused into the convolution layer, the operators of the batch norm layer and/or the scale layer are fused into the convolution operators of the convolution layer. In other words, the count of operators of the neural network after fusion is reduced. Due to the fact that CPU compiles the neural network according to the operators, the learning task compiling method of artificial intelligence processors may reduce the count of operators when compiling a neural network, thereby having high compiling efficiency. In addition, when learning tasks of a neural network are performed, data exchange is required every time after operations of an operator are completed. When a neural network is compiled according to the above-mentioned learning task compiling method of artificial intelligence processors and is executed by a device, data exchange may be reduced during the processing.

DETAILED DESCRIPTION

In order to make the purposes, technical schemes, and technical effects of the present disclosure clearer, the present disclosure will be described hereinafter with reference to the accompanied drawings and examples. It should be understood that the examples described here are merely used for explaining the present disclosure, rather than limiting the present disclosure.

The terms "first", "second", "third", and the like used in the description, the claims, and the drawings of the present disclosure are for distinguishing different objects rather than describing a specific order. Furthermore, the terms "including" and "having", as well as any variant of them, are intended to cover a non-exclusive inclusion. For instance, a process, a method, a system, a product, or a device including a series of steps or units is not limited to listed steps or units, but may optionally include steps or units that are not listed, or may optionally include other steps or units inherent to the process, method, product, or device.

Figure 11:
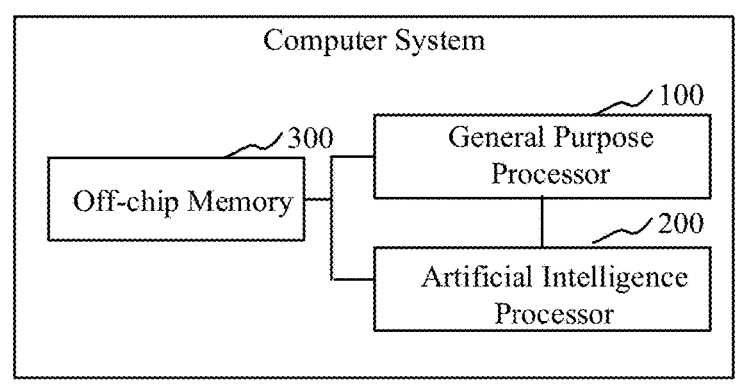
FIG. 11 is a structural diagram of a computer system according to an example.

FIG. 11 is a structural diagram of a computer system according to an example of the present disclosure. The computer system is a heterogeneous computer system. The computer system includes a general purpose processor 100 (CPU) configured to compile computer program codes to obtain an executable file. The general purpose processor 100 is further configured to execute a computer instruction of a general purpose processor. The computer system includes an artificial intelligence processor (IPU) 200 which may be an APU (Accelerated Processing Unit), a GPU (Graphics Processing Unit), an NPU (Neural Network Processing Unit), and the like. The artificial intelligence processor is configured to execute a computer instruction of the artificial intelligence processor.

Optionally, when compiling computer program codes, the general purpose processor 100 may compile general purpose processor codes and artificial intelligence processor codes respectively to obtain executable files of the general purpose processor 100 and the artificial intelligence processor 200. The executable files contain device information. The general purpose processor 100 may assemble and link the executable files of the general purpose processor 100 and the artificial intelligence processor 200 to obtain a binary instruction sequence (a program executable file).

The general purpose processor 100 may obtain a plurality of tasks according to the binary instruction sequence. Those tasks are distributed to the general purpose processor and the artificial intelligence processor for execution, and then output results of the program can be obtained.

The computer system includes an off-chip memory 300 configured to store data during the running of the program. For instance, the off-chip memory may store an execution result of each task.

Figure 1:
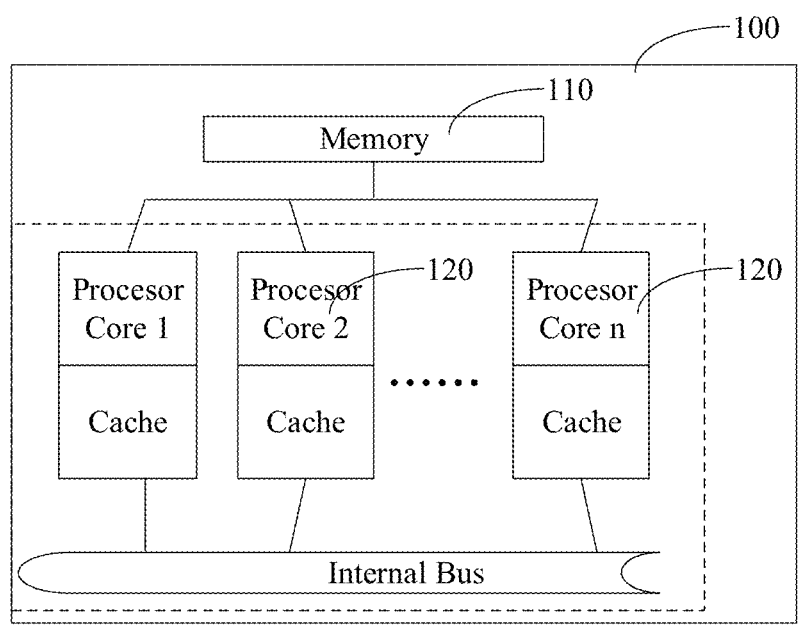
FIG. 1 is a structural diagram of a general purpose processor 100 according to an example.

Specifically, as shown in FIG. 1, the general purpose processor 100 includes a memory 110 and a plurality of processor cores 120. An executable instruction of the processor cores 120 is stored in the memory 110. The memory 110 may be used for on-chip storage and off-chip storage. The processor cores may communicate with each other via an internal bus. The processor cores are configured to perform optimization and compiling tasks on a structure of a neural network.

Furthermore, in order to determine which processor cores execute the plurality of tasks obtained from the binary instruction sequence as well as an order of execution of these tasks, as an optional example, the heterogeneous computer system may be connected to a task scheduling device 400. The task scheduling device may partition the binary instruction sequence obtained by the general purpose processor into a plurality of tasks for scheduling. A scheduling process may include creating a partition plan for the tasks according to basic information of the tasks (such as type, size, dependency, and the like) to obtain task partition information, which is obtaining a plan of task partitioning so as to obtain operations of the tasks; and scheduling the operations of the tasks to obtain scheduling information, which is obtaining a processor and/or a processor core for executing each of the tasks. After those operations are executed, operation results of the respective tasks can be obtained.

Figure 14:
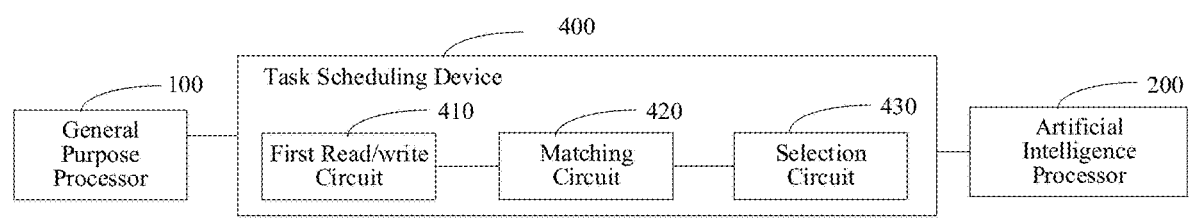
FIG. 14 is a structural diagram of a task scheduling device according to an example.

As shown in FIG. 14, the task scheduling device 400 may include a first read/write circuit 410, a matching circuit 420, and a selection circuit 430. The first read/write circuit 410, the matching circuit 420, and the selection circuit 430 are electrically connected in series. The selection circuit 430 is connected to the artificial intelligence processor. The task scheduling device 400 is configured to process the task partition information and all the task information to obtain the scheduling information. According to the scheduling information, the artificial intelligence processor can determine operations to be processed and an order of processing of the operations to be processed. The scheduling information may include operation identifiers of the plurality of operations, identification information of artificial intelligence processor corresponding to each operation, and information of the order in which the plurality of operations are processed by the corresponding artificial intelligence processor. Optionally, the artificial intelligence processor 200 may include a plurality of processor cores and a control device configured to control the operating of the processor cores. Optionally, the plurality of processor cores are all connected to the control device.

Specifically, when the first read/write circuit 410 receives a task scheduling request of tasks (such as learning tasks of the artificial intelligence processor), the first read/write circuit 410 is configured to obtain the partition information, all the task information, and status information of the processor according to the task scheduling request of tasks. Optionally, the first read/write control circuit may be an I/O circuit.

According to the partition information of the respective tasks, all the task information, and the status information of the artificial intelligence processor, the matching circuit 420 is configured to match the respective operations of tasks with the processor cores, and add operations that are successfully matched with processor cores to a set of operations to be scheduled. The set of operations to be scheduled may include operations of a plurality of tasks. Furthermore, if more than one operation of the tasks fails to be matched with processor cores within preset time (e.g. 128 ticks or 256 ticks), a signal of task scheduling failure is obtained.

Specifically, the matching circuit 420 is configured to obtain processor core information of the operations of the tasks (such as a type of a processor core) according to all the task information and the partition information of the tasks, and obtain information such as processing capabilities of the processor cores required by the operations according to sizes of the operations. The processor status information of the processor cores may include information about the type of a processor core, information about running status of a processor core, information about processing capability of a processor core, and the like. In this way, the matching circuit 120 is capable of matching the operations of the tasks with the processor cores according to all the task information, the task partition information, and the processor cores status information of the tasks. Optionally, the matching circuit 420 may be formed by more than one comparator being connected in parallel. Input data of each comparator may be the partition information, all the task information of the respective tasks, and the status information of the processor cores. Output data of each comparator may be a signal of matching success or a signal of matching failure. Furthermore, if the operations are successfully matched with the processor cores, the matching circuit is further configured to obtain information such as identifiers of the processor cores that are successfully matched with the operations. The identifiers are for identifying the processor cores (such as a serial number of a processor core).

According to target weights of the respective operations in the set of operations to be scheduled, the selection circuit 430 is configured to select target operations from the set of operations to be scheduled, and obtain scheduling information. Specifically, the task scheduling device 400 is configured to send a plurality of operations in the set of operations to be scheduled to the processor cores one by one for processing. The selection circuit 430 is configured to determine target operations for scheduling according to the target weights of the respective operations in the set of operations to be scheduled. The target weights of the respective operations in the set of operations to be scheduled may be obtained from computations, or may be preset.

Optionally, in an example, the selection circuit 430 may include an arithmetic unit and a selector connected to the arithmetic unit. The arithmetic unit is configured to determine scheduling priority of the respective operations according to the target weights of the respective operations in the set of operations to be scheduled. In other words, the arithmetic unit may sort the operations to obtain the scheduling priority of the respective operations according to the target weights of the respective operations in the set of operations to be scheduled. The selector is configured to determine that an operation with highest scheduling priority in the set of operations to be scheduled is a target operation according to the scheduling priority of the respective operations in the set of operations to be scheduled. The operation with the highest scheduling priority may be an operation with a largest weight. In other words, the target operation may be an operation with the largest weight in the set of operations to be scheduled. In this way, by scheduling the operation with the largest target weight first, the target operation may be the first to occupy processor resources, thereby optimizing the task scheduling process.

An example includes more than one set of operations to be scheduled. Each of the sets of operations to be scheduled is configured to store operations of a same operation type. A type of each object may be the same as a task type to which the operation belongs. The selection circuit includes an arithmetic unit and a selector. The arithmetic unit may be connected to the matching circuit. The selector may be connected to a second processor. According to expected weights and current history weights in the sets of operations to be scheduled corresponding respective operation types, the arithmetic unit is configured to determine target weights of the operations in the sets of operations to be scheduled corresponding the respective operation types, and determine that operations with largest target weights in the sets of operations to be scheduled corresponding to the respective operation types are operations to be launched of the operation types. The selector is configured to determine a target operation according to target weights of the respective operations to be launched and obtain scheduling information.

Figure 12:
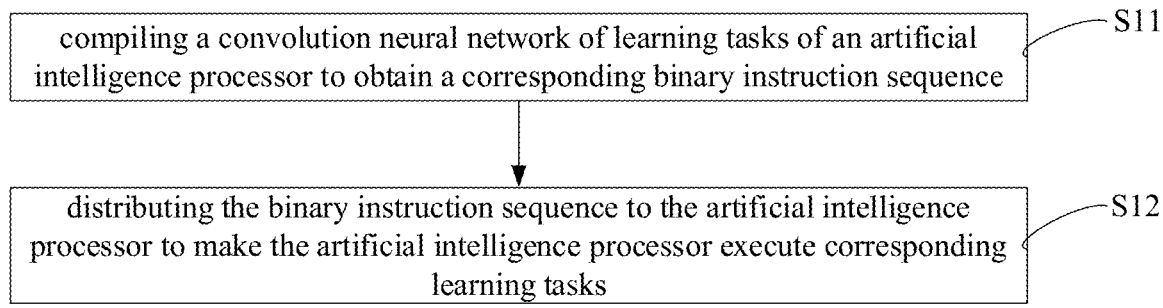
FIG. 12 is a flowchart of a neural network processing method of an example.

As shown in FIG. 12, an example provides a neural network processing method. An implementation process of the method is explained below with an instance in which the convolution neural network processing method is applied to the computer system of FIG. 11. The method may include:

S11, compiling a convolution neural network of learning tasks of an artificial intelligence processor to obtain a corresponding binary instruction sequence; and S12, distributing the binary instruction sequence to the artificial intelligence processor to make the artificial intelligence processor execute corresponding learning tasks.

The convolution neural network is a neural network that includes a plurality of neural network layers. Each of the neural network layers includes operators. An operator is a mapping from one function space to another function space, which is O: X→X. In other words, an operator indicates a computation/operation to be performed. Operators in a neural network are connected by weights to form a structure of neural network. Specifically, the general purpose processor 100 is configured to compile the convolution neural network to obtain the binary instruction sequence. Instructions in the binary instruction sequence are computer instructions of the artificial intelligence processor. The general purpose processor is configured to obtain corresponding learning tasks according to the binary instruction sequence. Furthermore, since the instructions in the binary instruction sequence are computer instructions of the artificial intelligence processor, the general purpose processor distributes the learning tasks to a device on the artificial intelligence processor to obtain a processing result of the convolution neural network.

Figure 13:
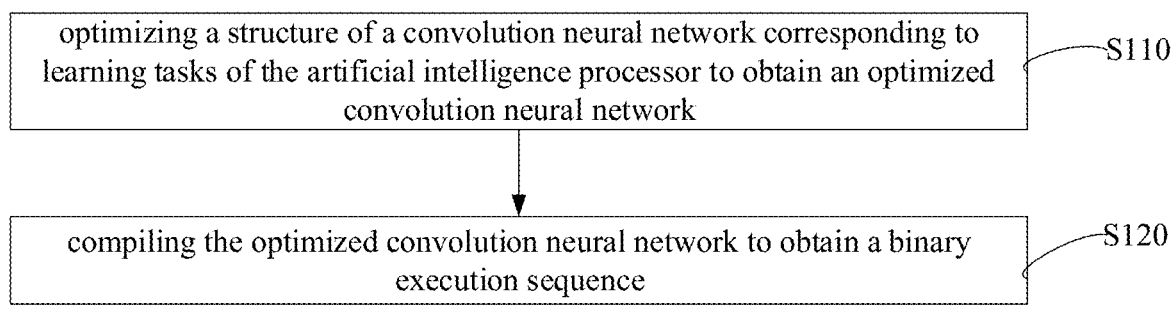
FIG. 13 is a flowchart of a learning task compiling method of artificial intelligence processors according to an example.

In an example, when the step S11 is performed, a neural network may be compiled according to the learning task compiling method of artificial intelligence processors provided in FIG. 13. An implementation process of the method is explained below with an instance in which the convolution neural network compiling method is applied to the computer system of FIG. 11. The method includes:

S110, optimizing a structure of a convolution neural network corresponding to learning tasks of the artificial intelligence processor to obtain an optimized convolution neural network; and S120, compiling the optimized convolution neural network to obtain a binary execution sequence.

Figure 2:
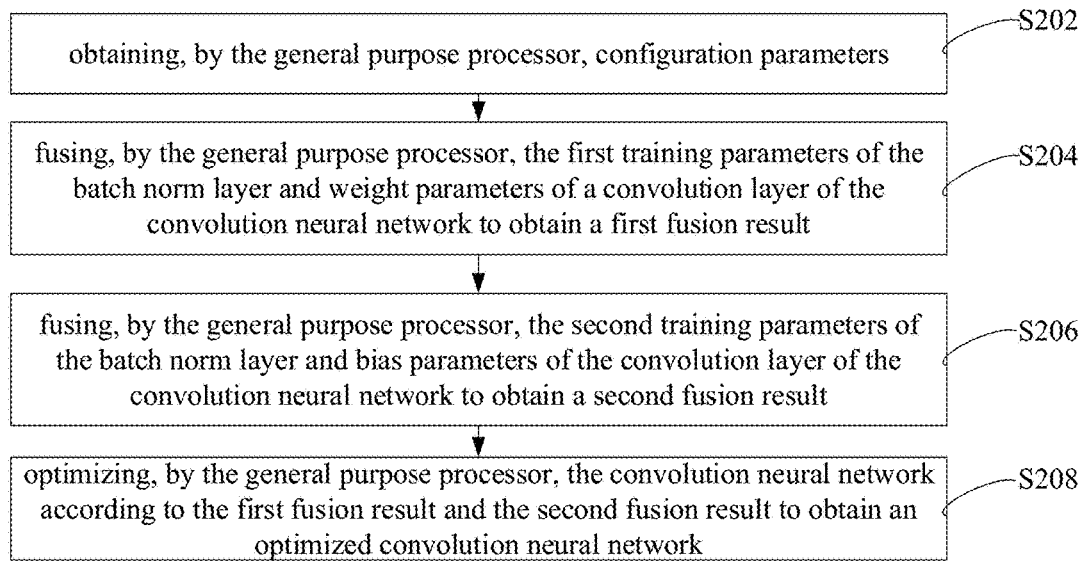
FIG. 2 is a flowchart of a step S110 according to an example.

As shown in FIG. 2, the step S110, which is an optimization process of the convolution neural network, may include:

a step 202, obtaining, by the general purpose processor, configuration parameters. The configuration parameters include first training parameters and second training parameters of a batch norm layer. The first training parameters and the second training parameters for convolution computations of the batch norm layer may be obtained within a Caffe framework. Optionally, the batch norm layer includes batch norm operators. The batch norm operators represent batch norm operations to be performed. Furthermore, Caffe refers to a convolution neural network framework, which is a commonly used deep learning framework. A Caffe source code file supports configuration and modification. In other words, a model may be redefined and optimized when Caffe is being configured. A Caffe framework refers to a mathematic model obtained by using a machine learning algorithm to perform training.

The step S110 may further include a step 204, fusing, by the general purpose processor, the first training parameters of the batch norm layer and weight parameters of a convolution layer of the convolution neural network to obtain a first fusion result. Specifically, the step may include fusing the first training parameters of the batch norm layer obtained in the step 202 and the weight parameters of the convolution layer to obtain the first fusion result. As an optional example, the first training parameters of the batch norm layer include at least one first training sub-parameter for performing the convolution computations of the batch norm layer. Specifically, if the first training parameters of the batch norm layer include a plurality of first training sub-parameters, the step includes performing fusion computations on all the first training sub-parameters of the batch norm layer and the weight parameters of the convolution layer.

The step S110 may further include a step 206, fusing, by the general purpose processor, the second training parameters of the batch norm layer and bias parameters of the convolution layer of the convolution neural network to obtain a second fusion result. Specifically, the step includes performing fusion computations on the second training parameters of the batch norm layer obtained in the step 202 and the bias parameters of the convolution layer to obtain the second fusion result. As an optional example, the second training parameters of the batch norm layer include at least one second training sub-parameter for performing the convolution computations of the batch norm layer. Specifically, if the second training parameters of the batch norm layer include a plurality of second training sub-parameters, the step includes performing fusion computations on all the second training sub-parameters of the batch norm layer and the bias parameters of the convolution layer.

The step S110 may further include a step 208, optimizing, by the general purpose processor, the convolution neural network according to the first fusion result and the second fusion result to obtain an optimized convolution neural network. Specifically, the step includes optimizing the convolution neural network according to the first fusion result obtained in the step 204 and the second fusion result obtained in the step 206.

By using the convolution neural network optimization method, the computations of the batch norm layer are fused into the convolution layer. The network performance may be greatly improved without network precision loss. At the same time, a redundant neural network layer is deleted after the network fusion, which may simplify the network structure and improve the operation speed of network.

The learning task compiling method of artificial intelligence processors based on the convolution neural network optimization method includes: first deleting a redundant neural network layer in a convolution neural network to simplify the neural network structure, and then compiling the simplified convolution network structure. In the optimized neural network, since the batch norm layer is fused into the convolution layer, batch norm operators of the batch norm layer are fused into convolution operators of the convolution layer. In other words, the count of operators of the neural network after fusion is reduced. Due to the fact that CPU compiles the neural network according to the operators, the learning task compiling method of artificial intelligence processors may reduce the count of operators when compiling a neural network, thereby having high compiling efficiency. In addition, when learning tasks of a neural network are performed, data exchange is required every time after operations of an operator are completed. When a neural network is compiled according to the above-mentioned learning task compiling method of artificial intelligence processors and is executed by a device, data exchange may be reduced during the processing.

The neural network processing method of the present example include: first optimizing a convolution neural network of a neural network, deleting a redundant neural network layer in the convolution neural network to simplify a network structure, and then compiling the optimized convolution neural network to obtain a binary instruction sequence. When the binary instruction sequence is partitioned into a plurality of learning tasks to be performed, operators of the convolution neural network corresponding to the binary instruction sequence are fused, reducing the count of operators. A heterogeneous computer system exchanges data with an off-chip cache every time after operations of an operator are completed. By adopting the present technical scheme, data exchange between the computer system and the off-chip cache may be reduced. In an example, the method includes multiplying the first training parameters of the batch norm layer by the weight parameters of the convolution layer to obtain the first fusion result.

Figure 3:
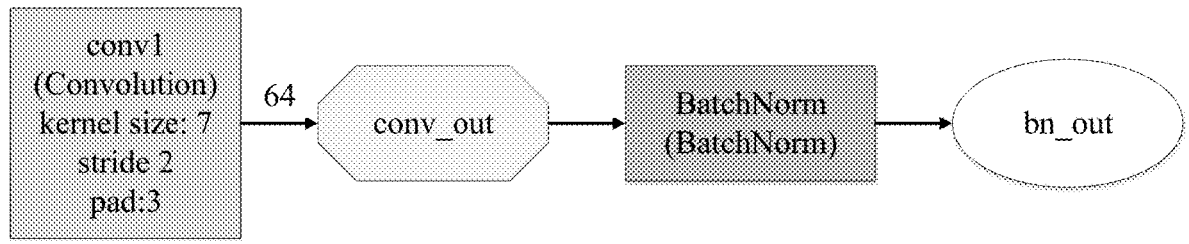
FIG. 3 is a diagram of a two-layer network structure optimization according to an example.

As shown in FIG. 3, a structure with two continuous layers including a convolution layer and a batch norm layer may be optimized to a structure with one convolution layer. In other words, computations of the batch norm layer may be fused into the convolution layer, and then the batch norm layer may be deleted.

The batch norm layer is used for normalizing input data, which can be represented as $$x_{norm} = \frac{x - \mu}{\sigma}.$$

x denotes the input data of the batch norm layer. $x_{norm}$ denotes normalized output data of the batch norm layer. μ denotes a mean value of accumulation computations. σ denotes a variance of accumulation computations.

The above-mentioned normalization is mainly a process of simplifying data. It can map the input data to the range [0,1] or [−1,1] and transform a dimensional expression into a dimensionless expression to obtain a scalar. The process may facilitate comparison and weighting of indicators with different units or magnitudes, thereby making data processing easier and faster.

For instance, a computation formula of the batch norm layer is $$\text{alpha} * \frac{(x - \text{mean} * \text{scale})}{sqrt(\text{var} * \text{scale})} + \text{beta}.$$

The computation formula is simplified to obtain a formula (1), which is:

$$\frac{\text{alpha}}{sqrt(\text{var} * \text{scale})} x - \text{alpha} * \text{mean} * sqrt\left(\frac{\text{scale}}{\text{var}}\right) + \text{beta}. \qquad (1)$$

A training process of the batch norm layer is as follows: obtaining mini-batch samples from all samples to perform forward training for a plurality of times, and updating computation parameters in the Caffe framework by means of moving average.

In an example, if the first training parameters of the batch norm layer include a plurality of first training sub-parameters, the method includes performing computations according to the plurality of first training sub-parameters to obtain a first intermediate operation result; and fusing the first intermediate operation result and the weight parameters of the convolution layer to obtain the first fusion result.

Specifically, in order to fuse the computation process of the batch norm layer into the convolution layer, the method may include obtaining the first training parameters and the second training parameters for the convolution computations of the batch norm layer. Referring to the formula (1), the first training parameters for performing the convolution computations of the batch norm layer include a plurality of first training sub-parameters (alpha, var,scale) The second training parameters for performing the convolution computations of the batch norm layer include a plurality of second training sub-parameters (alpha, mean, var, scale, beta).

The first training parameters or the second training parameters (alpha, mean, var,scale, beta) are vectors. The Caffe model may have more than one first training parameter or the second training parameter of each type. For instance, if the Caffe model has a plurality of first training sub-parameters alpha, then all alpha in the Caffe model may be obtained.

Specifically, still referring to the formula (1), the method includes multiplying the plurality of first training sub-parameters (alpha, var, scale) in the first training parameters by weights of the convolution layer. In other words, the method includes using the plurality of first training sub-parameters for computations to obtain the first intermediate operation result $$\frac{\text{alpha}}{sqrt(\text{var} * \text{scale})},$$

and multiplying the first intermediate operation result by the weights of the convolution layer to obtain the first fusion result $$\frac{\text{alpha}}{sqrt(\text{var} * \text{scale})} * \text{weights}.$$

In an example, the method includes adding, by the general purpose processor, the second training parameters of the batch norm layer and the bias parameters of the convolution layer to obtain the second fusion result.

In an example, if the second training parameters of the batch norm layer include a plurality of second training sub-parameters, the method includes performing computations according to the plurality of second training sub-parameters to obtain a second intermediate operation result; and fusing the second intermediate operation result and the bias parameters of the convolution layer to obtain the second fusion result.

For instance, still referring to the formula (1), the method includes multiplying the plurality of second training sub-parameters (alpha, mean, var, scale, beta) in the second training parameters by bias of the convolution layer. In other words, the method includes performing computations according to the plurality of second training sub-parameters to obtain the second intermediate operation result $$-alpha * mean * sqrt\left(\frac{scale}{var}\right) + beta,$$

and multiplying the second intermediate operation result by the bias of the convolution layer to obtain the second fusion result $$-alpha * mean * sqrt\left(\frac{scale}{var}\right) + beta + bias.$$

In an example, the method includes deleting the batch norm layer, changing the weight parameters of the convolution layer to the first fusion result, and changing the bias parameters of the convolution layer to the second fusion result.

In a multi-layer neural network, a batch norm layer is a network structure that is of less importance for model inference. For instance, a lightweight convolution neural network Mobile Net has a large number of structures with continuous convolution layers and batch norm layers. During forward propagation, building and executing the batch norm layers may consume a lot of computing resources, but bring repetition and complexity to the network structure. In this case, after the step 204 and the step 206, the convolution computations of the batch norm layers are fused into the convolution layers, and then the batch norm layers may be deleted.

Furthermore, the method may include changing the weight parameters of the convolution layers to the first fusion result obtained in the step 204. Referring to the formula (1), the weight parameters of the convolution layers are changed to the first fusion result $$\frac{alpha}{sqrt(var * scale)} * weights.$$

The method may include changing the bias parameters of the convolution layers to the second fusion result obtained in the step 206. Referring to the formula (1), the bias parameters of the convolution layers are changed to the second fusion result $$-alpha * mean * sqrt\left(\frac{scale}{var}\right) + beta + bias.$$

In this way, the normalization performed by the batch norm layers is fused into the convolution layers, the batch norm layers are deleted, and the structures with continuous convolution layers and batch norm layers are optimized. By using the convolution neural network optimization method, the data normalization process of a batch norm layer is fused into a convolution layer. The network performance may thus be greatly improved without network precision loss. At the same time, the batch norm layer is deleted after the network fusion, which may simplify the network structure and improve the operation speed of network.

As an optional example, if the convolution neural network includes a plurality of batch norm layers, each of batch norm layers is subject to the optimization process above. The normalization process of the plurality of batch norm layers is fused into a convolution layer. Then the plurality of redundant batch norm layers may be deleted, making the network structure clearer as well as greatly improving the network performance.

Figure 4:
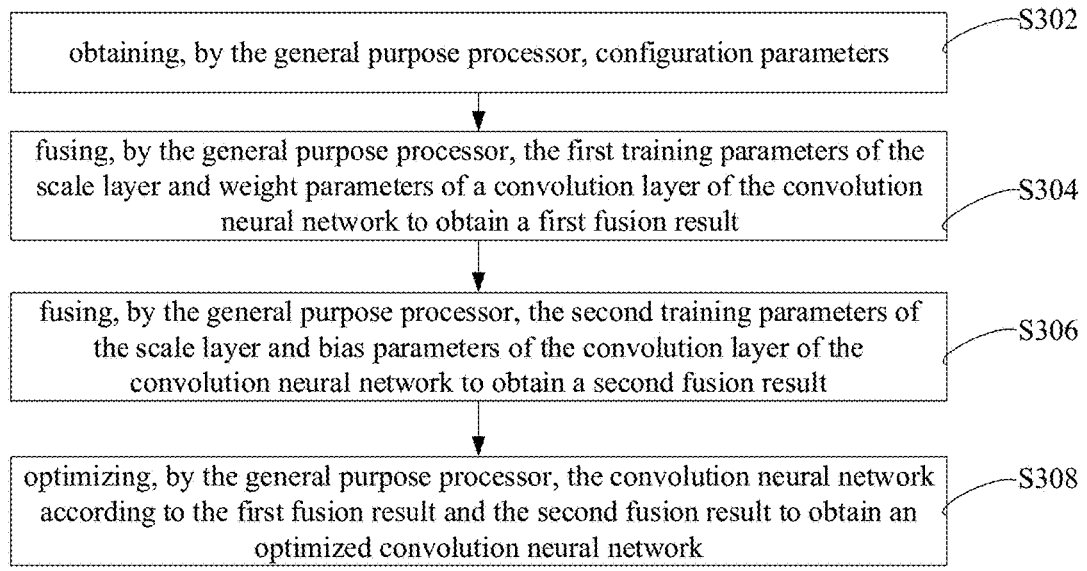
FIG. 4 is a flowchart of a step S110 according to another example.

As shown in FIG. 4, in an example, the step S110, which is an optimization process of the convolution neural network, may include:

a step 302, obtaining, by the general purpose processor, configuration parameters.

The configuration parameters include first training parameters and second training parameters of a scale layer of the convolution neural network corresponding to the learning tasks of the artificial intelligence processor. Specifically, the first training parameters and the second training parameters for performing convolution computations of the scale layer may be obtained from a Caffe framework.

The step S110 includes a step 304, fusing, by the general purpose processor, the first training parameters of the scale layer and weight parameters of a convolution layer of the convolution neural network to obtain a first fusion result.

Specifically, the step may include fusing the first training parameters of the scale layer obtained in the step 302 and the weight parameters of the convolution layer to obtain the first fusion result.

As an optional example, the first training parameters of the scale layer include at least one first training sub-parameter for performing the convolution computations of the scale layer.

Specifically, if the first training parameters of the scale layer include a plurality of first training sub-parameters, the step includes performing fusion computations on all the first training sub-parameters of the scale layer and the weight parameters of the convolution layer.

The step S110 includes a step 306, fusing, by the general purpose processor, the second training parameters of the scale layer and bias parameters of the convolution layer of the convolution neural network to obtain a second fusion result.

Specifically, the step may include performing fusion computations on the second training parameters of the scale layer obtained in the step 302 and the bias parameters of the convolution layer to obtain the second fusion result.

As an optional example, the second training parameters of the scale layer include at least one second training sub-parameter for performing the convolution computations of the scale layer.

Specifically, if the second training parameters of the scale layer include a plurality of second training sub-parameters, the step includes performing fusion computations on all the second training sub-parameters of the scale layer and the bias parameters of the convolution layer.

The step S110 includes a step 308, optimizing, by the general purpose processor, the convolution neural network according to the first fusion result and the second fusion result to obtain an optimized convolution neural network.

Specifically, the step may include optimizing the convolution neural network according to the first fusion result obtained in the step 304 and the second fusion result obtained in the step 306.

By using the convolution neural network optimization method, the computations of a scale layer are fused into a convolution layer. The network performance may be greatly improved without network precision loss. At the same time, a redundant neural network layer is deleted after the network fusion, which may simplify the network structure and improve the operation speed of network.

The learning task compiling method of artificial intelligence processors based on the convolution neural network optimization method includes: first deletes a redundant neural network layer in a convolution neural network to simplify the neural network structure, and then compiles the simplified convolution network structure. In the optimized neural network, since the scale layer is fused into the convolution layer, the scale operators of the scale layer are fused into the convolution operators of the convolution layer. In other words, the count of operators of the neural network after fusion is reduced. Due to the fact that CPU compiles the neural network according to the operators, the learning task compiling method of artificial intelligence processors may reduce the count of operators when compiling a neural network, thereby having high compiling efficiency. In addition, when learning tasks of a neural network are performed, data exchange is required every time after operations of an operator are completed. When a neural network is compiled according to the above-mentioned learning task compiling method of artificial intelligence processors and is executed by a device, data exchange may be reduced during the processing.

In an example, the method includes multiplying the first training parameters of the scale layer by the weight parameters of the convolution layer to obtain the first fusion result.

Figure 5:
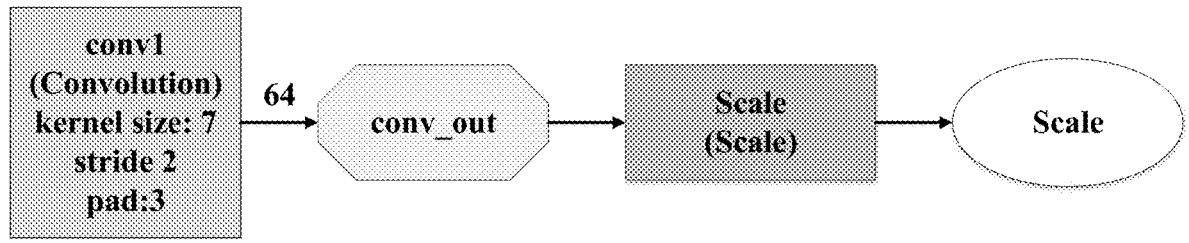
FIG. 5 is a diagram of a two-layer network structure optimization according to another example.

As shown in FIG. 5, a structure with two continuous layers including a convolution layer and a scale layer may be optimized as a structure including a convolution layer. In other words, the computations of the scale layer are fused into the convolution layer, then the scale layer is deleted.

The scale layer is used for scaling and translating normalized data, which can be represented as $y=\gamma * x_{norm}+\beta$. $x_{norm}$ denotes normalized input data of the scale layer. $\gamma$ denotes a scale amount. $\beta$ denotes a translation amount.

For instance, formula (2) below is a computation formula of the scale layer:

$$alpha * x + beta \quad (2).$$

Specifically, in order to fuse the computation process of the scale layer into the convolution layer, the first training parameters and the second training parameters for the convolution computations of the scale layer may be obtained. Referring to the formula (2), the first training parameters for performing the convolution computations of the scale layer include a first training sub-parameter (alpha). The second training parameters for performing the convolution computations of the scale layer include a second training sub-parameter (beta).

The first training parameters or the second training parameters (alpha, beta) are vectors. The Caffe model may have more than one first training parameter or the second training parameter of each type. For instance, if the Caffe model has a plurality of first training sub-parameters alpha, then all alpha in the Caffe model may be obtained.

Specifically, still referring to the formula (2), the process includes multiplying the first training sub-parameters (alpha) in the weight parameters by weights of the convolution layer. In other words, alpha in the formula (2) is multiplied by the weights of the convolution layer to obtain the first fusion result alpha*weights.

In an example, the method includes adding the second training parameters of the scale layer and the bias parameters of the convolution layer to obtain the second fusion result.

For instance, still referring to the formula (2), the method includes adding the second training sub-parameters (beta) in the second training parameters of the scale layer and the bias of the convolution layer. In other words, beta in the formula (2) is added to the bias of the convolution layer to obtain the second fusion result beta+bias.

In an example, the method includes deleting, by the general purpose processor, the scale layer, changing the weight parameters of the convolution layer to the first fusion result, and changing the bias parameters of the convolution layer to the second fusion result.

In a multi-layer neural network, a scale layer is a network structure that is of less importance for model training. For instance, a lightweight convolution neural network Mobile Net has a large number of structures with continuous convolution layer and scale layer. During forward propagation, the scale layers have little to do with the convolution computations, but bring repetition and complexity to the network structure. In this case, after the step 304 and the step 306, the convolution computations of the scale layers are fused into the convolution layers, then the scale layers may be deleted.

Furthermore, the method may include changing the weight parameters of the convolution layers to the first fusion result obtained in the step 304. Referring to the formula (1), the weight parameters of the convolution layers are changed to the first fusion result alpha*weights. The method may also include changing the bias parameters of the convolution layers to the second fusion result obtained in the step 306. Referring to the formula (1), the bias parameters of the convolution layers are changed to the second fusion result −beta+bias. In this way, the normalization performed by the scale layers is fused into the convolution layers, the scale layers are deleted, and the structures with continuous convolution layer and scale layer are optimized.

By using the convolution neural network optimization method, the data normalization process of a scale layer is fused into a convolution layer. The network performance may be greatly improved without network precision loss. At the same time, the scale layers are deleted after the network fusion, which may simplify the network structure and improve the operation speed of network. As an optional example, if the convolution neural network includes a plurality of scale layers, each of scale layers is subject to the optimization process above. The scale and translation process of the plurality of scale layers is fused into the convolution layer. Then the plurality of redundant scale layers may be deleted, making the network structure clearer as well as greatly improving the network performance.

Figure 6:
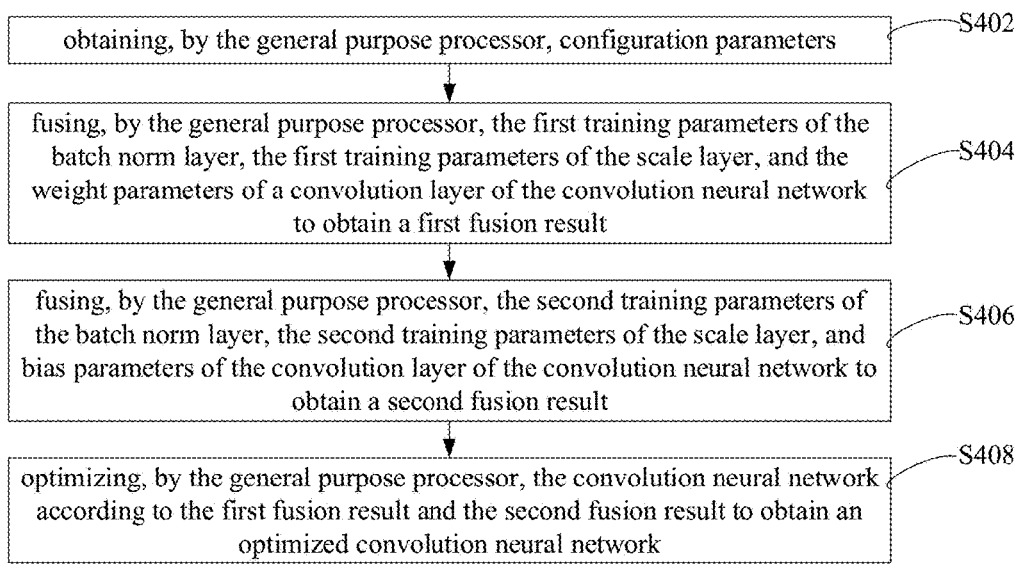
FIG. 6 is a flowchart of a step S110 according to another example.

As shown in FIG. 6, in an example, the step S110, which is an optimization process of the convolution neural network, may include:

a step 402, obtaining, by the general purpose processor, first configuration parameters and second configuration parameters.

The first configuration parameters include first training parameters and second training parameters of a batch norm layer of the convolution neural network corresponding to the learning tasks of the artificial intelligence processor. The second configuration parameters include first training parameters and second training parameters of a scale layer of the convolution neural network corresponding to the learning tasks of the artificial intelligence processor.

Specifically, the first training parameters and the second training parameters for performing convolution computations of the batch norm layer may be obtained from a Caffe framework. The first training parameters and the second training parameters for performing convolution computations of the scale layer may also be obtained from the Caffe framework.

The step S110 includes a step 404, fusing, by the general purpose processor, the first training parameters of the batch norm layer, the first training parameters of the scale layer, and weight parameters of a convolution layer of the convolution neural network to obtain a first fusion result.

Specifically, the step may include performing fusion computations on the first training parameters of the batch norm layer of the convolution neural network corresponding to the learning tasks of the artificial intelligence processor and the first training parameters of the scale layer of the convolution neural network corresponding to the learning tasks of the artificial intelligence processor obtained in the step 402, as well as the weight parameters of the convolution layer to obtain the first fusion result.

As an optional example, the first training parameters of the batch norm layer include at least one first training sub-parameter for performing the convolution computations of the batch norm layer. The first training parameters of the scale layer include at least one first training sub-parameter for performing the convolution computations of the scale layer.

Specifically, if the first training parameters of the batch norm layer include a plurality of first training sub-parameters, the step includes performing fusion computations on all the first training sub-parameters of the batch norm layer and the weight parameters of the convolution layer. If the first training parameters of the scale layer include a plurality of first training sub-parameters, the step includes performing fusion computations on all the first training sub-parameters of the scale layer and the weight parameters of the convolution layer.

The step S110 includes a step 406, fusing, by the general purpose processor, the second training parameters of the batch norm layer, the second training parameters of the scale layer, and bias parameters of the convolution layer of the convolution neural network to obtain a second fusion result.

Specifically, the step may include performing fusion computations on the second training parameters of the batch norm layer of the convolution neural network corresponding to the learning tasks of the artificial intelligence processor, the second training parameters of the scale layer of the convolution neural network corresponding to the learning tasks of the artificial intelligence processor obtained in the step 402, as well as the bias parameters of the convolution layer to obtain the second fusion result.

As an optional example, the second training parameters of the batch norm layer include at least one second training sub-parameter for performing the convolution computations of the batch norm layer. The second training parameters of the scale layer include at least one second training sub-parameter for performing the convolution computations of the scale layer.

Specifically, if the second training parameters of the batch norm layer include a plurality of second training sub-parameters, the step includes performing fusion computations on all the second training sub-parameters of the batch norm layer and the bias parameters of the convolution layer. If the second training parameters of the scale layer include a plurality of second training sub-parameters, the step includes performing fusion computations on all the second training sub-parameters of the scale layer and the bias parameters of the convolution layer.

The step S110 includes a step 408, optimizing, by the general purpose processor, the convolution neural network according to the first fusion result and the second fusion result to obtain an optimized convolution neural network.

By using the convolution neural network optimization method, the computations of the batch norm layer and the scale layer are fused into a convolution layer. The network performance may be greatly improved without network precision loss. At the same time, a redundant neural network layer is deleted after the network fusion, which may simplify the network structure and improve the operation speed of network.

The learning task compiling method of artificial intelligence processors based on the convolution neural network optimization method includes first deleting a redundant neural network layer in a convolution neural network to simplify the neural network structure, and then compiling the simplified convolution network structure. In the optimized neural network, since the batch norm layer and the scale layer are fused into the convolution layer, the operators of the batch norm layer and the operators of the scale layer are fused into the convolution operators of the convolution layer. In other words, the count of operators of the neural network after fusion is reduced. Due to the fact that CPU compiles the neural network according to the operators, the learning task compiling method of artificial intelligence processors may reduce the count of operators when compiling a neural network, thereby having high compiling efficiency. In addition, when learning tasks of a neural network are performed, data exchange is required every time after operations of an operator are completed. When a neural network is compiled according to the above-mentioned learning task compiling method of artificial intelligence processors and is executed by a device, data exchange may be reduced during the processing.

In an example, the method includes multiplying the first training parameters of the batch norm layer, the first training parameters of the scale layer, and the weight parameters of the convolution layer to obtain the first fusion result.

Figure 7:
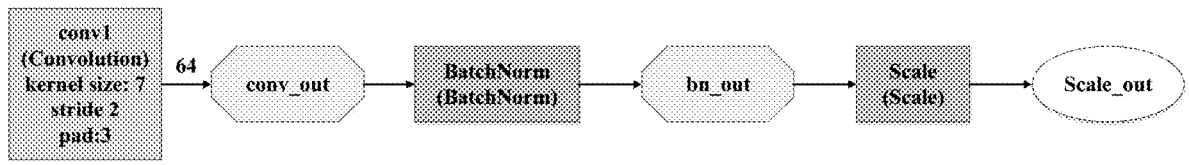
FIG. 7 is a diagram of a three-layer network structure optimization according to another example.

As shown in FIG. 7, a structure with three continuous layers including a convolution layer, a batch norm layer, and a scale layer may be optimized to a structure with one convolution layer. In other words, computations of the batch norm layer and the scale layer may be fused into the convolution layer, then the batch norm layer and scale layer may be deleted. Although FIG. 7 only shows a positional relationship among the convolution layer, the batch norm layer, and the scale layer, yet the present technical scheme may also be applied to an example where the batch norm layer and the scale layer switch positions.

Specifically, in order to fuse the computation process of the batch norm layer and the scale layer into the convolution layer, the first training parameters and the second training parameters for the convolution computations of the batch norm layer may be obtained, and the first training parameters and the second training parameters for the convolution computations of the scale layer may also be obtained.

In an example, if the first training parameters of the batch norm layer include a plurality of first training sub-parameters, the method includes performing computations according to the plurality of first training sub-parameters to obtain a first intermediate operation result; and fusing the first intermediate operation result, the first training parameters of the scale layer, and the weight parameters of the convolution layer to obtain the first fusion result.

For instance, referring to the formula (1) and the formula (2), the method includes multiplying the plurality of first training sub-parameters (alpha, sqrt, var, scale) in the first training parameters of the batch norm layer, the first training sub-parameters (alpha) in the first training parameters of the scale layer, and the weights of the convolution layer. In other words, $$\frac{alpha}{sqrt(var*scale)}$$

in the formula (1), which is the first intermediate operation result obtained from computations of the plurality of first training sub-parameters, alpha in the formula (2), and the weights of the convolution layer are multiplied to obtain the first fusion result $$\frac{alpha}{sqrt(var*scale)}*alpha*weights.$$

In an example, the method includes adding the second training parameters of the batch norm layer, the second training parameters of the scale layer, and the bias parameters of the convolution layer to obtain the second fusion result.

In an example, if the second training parameters of the batch norm layer include a plurality of second training sub-parameters, the step includes performing computations according to the plurality of second training sub-parameters to obtain a second intermediate operation result; and fusing the second intermediate operation result, the second training parameters of the scale layer, and the bias parameters of the convolution layer to obtain the second fusion result.

For instance, still referring to the formula (1), the step includes adding the plurality of second training sub-parameters (alpha, mean, var, scale, beta) in the second training parameters of the batch norm layer, the second training sub-parameters (beta) in the second training parameters of the scale layer, and the bias of the convolution layer. In other words, $$-alpha*mean*sqrt\left(\frac{scale}{var}\right)+beta$$

in the formula (1), which is the second intermediate operation result obtained from computations of the plurality of second training sub-parameters, beta in the formula (2), and the bias of the convolution layer are added to obtain the second fusion result $$-alpha*mean*sqrt\left(\frac{scale}{var}\right)+beta+beta+bias.$$

In an example, the step includes deleting the batch norm layer and the scale layer, changing the weight parameters of the convolution layer to the first fusion result, and changing the bias parameters of the convolution layer to the second fusion result.

In a multi-layer neural network, a batch norm layer and a scale layer are network structures that are of less importance for model training. For instance, a lightweight convolution neural network Mobile Net has a large number of structures with continuous convolution layer, batch norm layer, and scale layer. During forward propagation, the batch norm layers and the scale layers have little to do with the convolution computations, but bring repetition and complexity to the network structure. In this case, after the step 404 and the step 406, the convolution computations of the scale layers and the batch norm layers are fused into the convolution layers, then the scale layers and the batch norm layers may be deleted.

Furthermore, the weight parameters of the convolution layers may be changed to the first fusion result obtained in the step 404. Referring to the formula (1), the weight parameters of the convolution layers may be changed to the first fusion result $$\frac{alpha}{sqrt(var*scale)}*alpha*weights.$$

The bias parameters of the convolution layers may be changed to the second fusion result obtained in the step 406. Still referring to the formula (1), the bias parameters of the convolution layers may be changed to the second fusion result $$-alpha*mean*sqrt\left(\frac{scale}{var}\right)+beta+beta+bias.$$

In this way, the normalization performed by the batch norm layers and the scale layers is fused into the convolution layers, then the batch norm layers and the scale layers may be deleted to finish optimizing the structures with continuous convolution layers, batch norm layers, and scale layers.

By using the convolution neural network optimization method, the data normalization process of a batch norm layer and a scale layer is fused into a convolution layer. The network performance may thus be greatly improved without network precision loss. At the same time, the batch norm layer and the scale layer are deleted after the network fusion, which may simplify the network structure and improve the operation speed of network.

Figure 8:
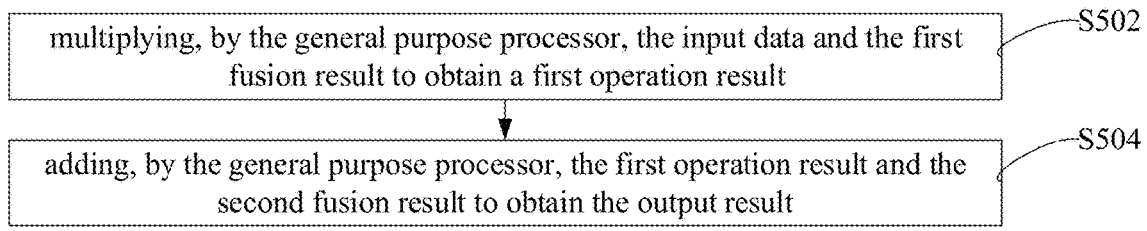
FIG. 8 is a flowchart of a step S110 according to another example.

An example provides a convolution neural network optimization method to implement the convolution neural network optimization of the step S110. The method may be applied to a general purpose processor of FIG. 1. The method includes performing convolution computations on input data of a convolution layer and the first fusion result, performing convolution computations on the input data of the convolution layer and the second fusion result, so as to obtain an output result of the convolution layer. As shown in FIG. 8, the step S110 includes:

a step 502, multiplying, by the general purpose processor, the input data and the first fusion result to obtain a first operation result.

Referring to FIG. 2, an optional example provides an optimization method of fusing a batch norm layer to a convolution layer for a two-layer convolution neural network. According to the formula (1), input data x of the convolution layer is multiplied by the first fusion result $$\frac{alpha}{sqrt(var*scale)}*weights$$

to obtain the first operation result $$x*\frac{alpha}{sqrt(var*scale)}*weights.$$

Referring to FIG. 4, an optional example provides an optimization method of fusing a scale layer to a convolution layer for a two-layer convolution neural network. According to the formula (2), input data x of the convolution layer is multiplied by the first fusion result alpha*weights to obtain the first operation result x*alpha*weights.

Referring to FIG. 6, an optional example provides an optimization method of fusing a batch norm layer and a scale layer to a convolution layer for a three-layer convolution neural network. According to the formula (1) and the formula (2), input data x of the convolution layer is multiplied by the first fusion result $$\frac{alpha}{sqrt(var*scale)}*alpha*weights.$$

to obtain the first operation result $$x*\frac{alpha}{sqrt(var*scale)}*alpha*weights.$$

The method includes: a step 504, adding, by the general purpose processor, the first operation result and the second fusion result to obtain the output result.

Referring to FIG. 2, regarding an optional example of the optimization method of fusing a scale layer to a convolution layer for a two-layer convolution neural network, the second fusion result is $$-alpha*mean*sqrt\left(\frac{scale}{var}\right)+beta+bias,$$

according to the formula (1). The first operation result $$x*\frac{alpha}{sqrt(var*scale)}*weights$$

is added to the second fusion result $$-alpha*mean*sqrt\left(\frac{scale}{var}\right)+beta+bias$$

to obtain the output result $$x*\frac{alpha}{sqrt(var*scale)}*weights-alpha*mean*sqrt\left(\frac{scale}{var}\right)+beta+bias.$$

Referring to FIG. 4, regarding an optional example of the optimization method of fusing a scale layer to a convolution layer for a two-layer convolution neural network, the second fusion result is beta+bias according to the formula (2). The first operation result x*alpha*weights is added to the second fusion result beta+bias to obtain the output result x*alpha*weights+beta+bias.

Referring to FIG. 6, regarding an optional example of the optimization method of fusing a batch norm layer and a scale layer to a convolution layer for a three-layer convolution neural network, the second fusion result is $$-alpha*mean*sqrt\left(\frac{scale}{var}\right)+beta+beta+bias$$

according to the formula (1) and the formula (2). The first operation result $$x*\frac{alpha}{sqrt(var*scale)}*alpha*weights.$$

is added to the second fusion result $$-alpha*mean*sqrt\left(\frac{scale}{var}\right)+beta+beta+bias$$

to obtain the output result $$x*\frac{alpha}{sqrt(var*scale)}*alpha*weights-$$
$$alpha*mean*sqrt\left(\frac{scale}{var}\right)+beta+beta+bias.$$

When the above-mentioned convolution neural network optimization methods are adopted, input data of a convolution layer is subject to convolution computations with the first fusion result and the second fusion result respectively. The methods may ensure that computations do not overflow and there is no precision loss after a network is optimized, thereby improving the network operation speed.

Figure 9:
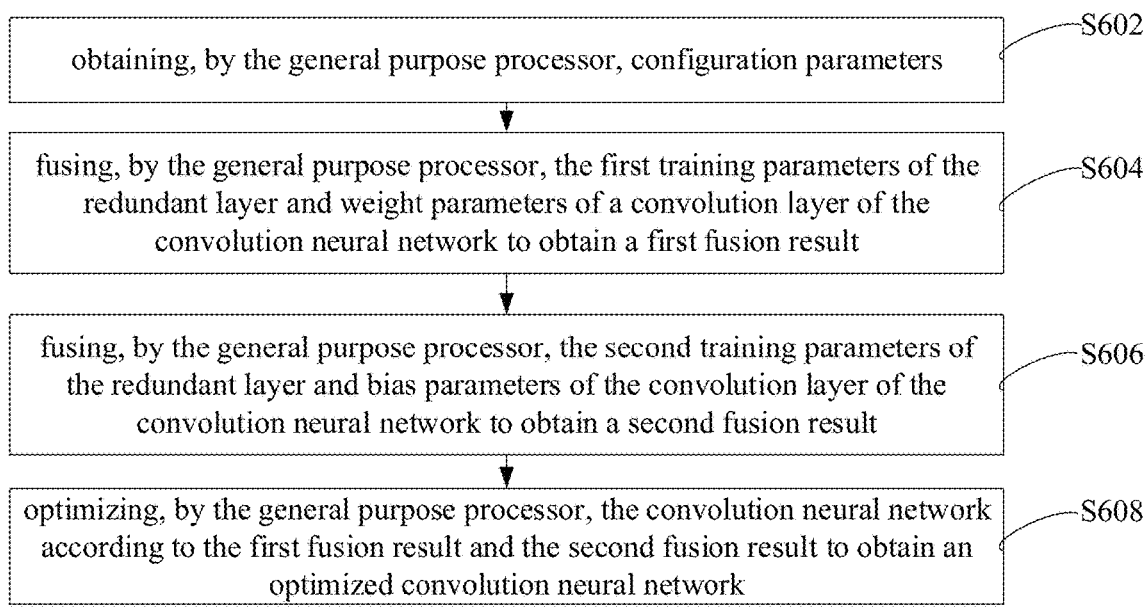
FIG. 9 is a flowchart of a step S110 according to another example.

As shown in FIG. 9, in an example, the step S110, which is an optimization process of the convolution neural network, may include:

a step 602, obtaining, by the general purpose processor, configuration parameters.

The configuration parameters include first training parameters and second training parameters of a redundant layer of the convolution neural network. The first training parameters include one or a plurality of first training sub-parameters. The second training parameters include one or a plurality of second training sub-parameters.

The step S110 includes a step 604, fusing, by the general purpose processor, the first training parameters of the redundant layer and weight parameters of a convolution layer of the convolution neural network to obtain a first fusion result.

Specifically, the step may include: fusing the first training parameters obtained in the step 602 and the weight parameters of the convolution layer to obtain the first fusion result.

As an optional example, the step may include multiplying the first training parameters by the weight parameters of the convolution layer of the convolution neural network to obtain the first fusion result.

Specifically, if the first training parameters include a plurality of first training sub-parameters, the method includes multiplying all the first training sub-parameters by the weight parameters of the convolution layer.

The step S110 includes a step 606, fusing, by the general purpose processor, the second training parameters of the redundant layer and bias parameters of the convolution layer of the convolution neural network to obtain a second fusion result.

Specifically, the step may include fusing the second training parameters of the redundant layer of the convolution neural network obtained in the step 602 and the bias parameters of the convolution layer of the convolution neural network to obtain the second fusion result.

As an optional example, the step may include adding the second training parameters and the bias parameters of the convolution layer of the convolution neural network to obtain the second fusion result.

Specifically, if the second training parameters include a plurality of second training sub-parameters, the step includes adding all the second training sub-parameters and the bias parameters of the convolution layer.

The step S110 includes a step 608, optimizing, by the general purpose processor, the convolution neural network according to the first fusion result and the second fusion result to obtain an optimized convolution neural network.

Specifically, the step may include optimizing the convolution neural network according to the first fusion result obtained in the step 604 and the second fusion result obtained in the step 606.

As an optional example, the step includes deleting the redundant layer, changing the weight parameters of the convolution layer to the first fusion result, and changing the bias parameters of the convolution layer to the second fusion result.

The redundant layer refers to a network structure that is deployed in a multi-layer neural network, but is of less importance for model inference. For instance, a lightweight convolution neural network Mobile Net has a large number of structures with continuous convolution layers, batch norm layers, and scale layers. During forward propagation, the batch norm layers and the scale layers have little to do with the convolution computations, but bring repetition and complexity to the network structure. In this case, the scale layers and the batch norm layers may be regarded as redundant layers. However, redundant neural network layers are not limited to the batch norm layers and the scale layers.

Furthermore, the weight parameters of the convolution layers may be changed to the first fusion result obtained in the step 604. The bias parameters of the convolution layers may be changed to the second fusion result obtained in the step 606. In this way, the data processing performed by the redundant layers is fused into the convolution layers, the redundant layers are then deleted, and the structure optimization of the convolution layers and the redundant layers is completed.

By using the convolution neural network optimization method, the computations of redundant neural network layer are fused into a convolution layer. The network performance may be greatly improved without network precision loss. At the same time, redundant neural network layers are deleted after the network fusion, which may simplify the network structure and improve the operation speed of network.

The learning task compiling method of artificial intelligence processors based on the convolution neural network optimization method includes: first deleting a redundant neural network layer in a convolution neural network to simplify the neural network structure, and then compiling the simplified convolution network structure. In the optimized neural network, since the redundant layer is fused into a convolution layer, the operators of the redundant layer are fused into the convolution operators of the convolution layer. In other words, the count of operators of the neural network after fusion is reduced. Due to the fact that CPU compiles the neural network according to the operators, the learning task compiling method of artificial intelligence processors may reduce the count of operators when compiling a neural network, thereby having high compiling efficiency. In addition, when learning tasks of a neural network are performed, data exchange is required every time after operations of an operator are completed. When a neural network is compiled according to the above-mentioned learning task compiling method of artificial intelligence processors and is executed by a device, data exchange may be reduced during the processing.

In Mobile Net, a new network parameter such as opt_level may be added to a Caffe source code file filecaffe.proto for indicating the network optimization level. By setting a value of the parameter, a network structure of a convolution neural network can be automatically detected. According to the parameter value, a corresponding convolution neural network optimization method can be automatically called, which may reduce learning costs for users and retain users' right to choose while improving ease of use It should be understood that though respective steps in the flowcharts FIGS. 2-9 are shown following the direction of arrows, yet these steps may not necessarily be performed following the order indicated by the arrows. Unless clearly stated herein, the order for performing these steps is not strictly confined. These steps may be performed in a different order. Furthermore, at least part of the steps in FIGS. 2-9 may include a plurality of sub-steps or a plurality of phases. These sub-steps or phases may not necessarily be performed and completed at the same time or be performed sequentially, instead, these sub-steps or phases may be performed in turn or alternately with other steps, or the sub-steps of other steps, or at least part of the phases.

Figure 10:
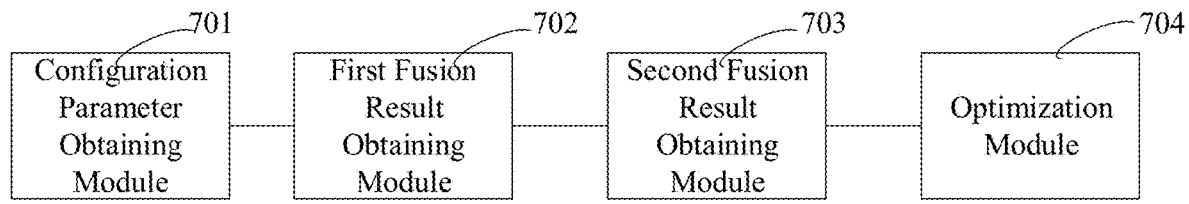
FIG. 10 is a structural diagram of a device for compiling learning tasks of artificial intelligence processors according to an example.

As shown in FIG. 10, an example provides a learning task compiling device of artificial intelligence processors, including: a configuration parameter obtaining module 701, a first fusion result obtaining module 702, a second fusion result obtaining module 703, an optimization module 704.

The configuration parameter obtaining module 701 is configured to obtain configuration parameters. The configuration parameters include first training parameters and second training parameters of a scale layer of a convolution neural network corresponding to learning tasks of the artificial intelligence processor.

The first fusion result obtaining module 702 is configured to fuse the first training parameters of the batch norm layer and weight parameters of a convolution layer of the convolution neural network to obtain a first fusion result.

The second fusion result obtaining module 703 is configured to fuse the second training parameters of the batch norm layer and bias parameters of the convolution layer of the convolution neural network to obtain a second fusion result.

The optimization module 704 is configured to optimize the convolution neural network according to the first fusion result and the second fusion result to obtain an optimized convolution neural network. The optimization module 704 is further configured to compile the optimized convolution neural network to obtain a corresponding binary instruction, and distribute the binary instruction to the artificial intelligence processor for executing corresponding learning tasks.

In an example, the configuration parameter obtaining module 701 is further configured to obtain configuration parameters. The configuration parameters include first training parameters and second training parameters of a scale layer.

In one example, the configuration obtaining module 701 is further configured to obtain first configuration parameters and second configuration parameters. The first configuration parameters include the first training parameters and the second training parameters of the batch norm layer. The second configuration parameters include the first training parameters and the second training parameters of the scale layer.

In an example, the first fusion result obtaining module 702 is further configured to fuse the first training parameters of the scale layer and the weight parameters of the convolution layer of the convolution neural network to obtain the first fusion result.

In an example, the first fusion result obtaining module 702 is further configured to fuse the first training parameters of the batch norm layer, the first training parameters of the scale layer, and the weight parameters of the convolution layer of the convolution neural network to obtain the first fusion result.

In an example, the second fusion result obtaining module 703 is further configured to fuse the second training parameters of the scale layer and the bias parameters of the convolution layer of the convolution neural network to obtain the second fusion result.

In an example, the second fusion result obtaining module 703 is further configured to fuse the second training parameters of the batch norm layer, the second training parameters of the scale layer, and the bias parameters of the convolution layer of the convolution neural network to obtain the second fusion result.

In an example, the optimization module 704 is further configured to delete the batch norm layer, change the weight parameters of the convolution layer to the first fusion result, and change the bias parameters of the convolution layer to the second fusion result.

In an example, the optimization module 704 is further configured to delete the scale layer, change the weight parameters of the convolution layer to the first fusion result, and change the bias parameters of the convolution layer to the second fusion result.

In an example, the optimization module 704 is further configured to delete the batch norm layer and the scale layer, change the weight parameters of the convolution layer to the first fusion result, and change the bias parameters of the convolution layer to the second fusion result.

A specific description of the operation device is similar to the description of the operation method in the preceding part, and is thus omitted here. Each of the modules of the operation device above may be wholly or partially implemented by means of software, hardware, and a combination thereof. Each of the modules may be embedded or independently arranged in a processor of a computer equipment in a form of hardware, and may also be stored in a memory of the computer equipment in a form of software so that the processor may call and perform a corresponding operation of each of the modules.

An example provides a computer readable storage medium. A computer program is stored in the computer readable storage medium. The computer program implements the following steps when being executed by a processor: obtaining configuration parameters, where the configuration parameters include first training parameters and second training parameters of a batch norm layer of a convolution neural network corresponding to learning tasks of an artificial intelligence processor; fusing the first training parameters of the batch norm layer and weight parameters of a convolution layer of the convolution neural network to obtain a first fusion result; fusing the second training parameters of the batch norm layer and bias parameters of the convolution layer of the convolution neural network to obtain a second fusion result; and optimizing the convolution neural network according to the first fusion result and the second fusion result to obtain an optimized convolution neural network.

An example provides a computer readable storage medium. A computer program is stored in the computer readable storage medium. The computer program implements the following steps when being executed by a processor: obtaining configuration parameters, where the configuration parameters include first training parameters and second training parameters of a scale layer of a convolution neural network corresponding to learning tasks of an artificial intelligence processor; fusing the first training parameters of the scale layer and weight parameters of a convolution layer of the convolution neural network to obtain a first fusion result; fusing the second training parameters of the scale layer and bias parameters of the convolution layer of the convolution neural network to obtain a second fusion result; optimizing the convolution neural network according to the first fusion result and the second fusion result to obtain an optimized convolution neural network; and compiling the optimized convolution neural network to obtain a corresponding binary instruction, and distributing the binary instruction to the artificial intelligence processor for executing corresponding learning tasks.

An example provides a computer readable storage medium. A computer program is stored in the computer readable storage medium. The computer program implements the following steps when being executed by a processor: obtaining first configuration parameters and second configuration parameters, where the first configuration parameters include first training parameters and second training parameters of a batch norm layer of a convolution neural network corresponding to learning tasks of an artificial intelligence processor, and the second configuration parameters include first training parameters and second training parameters of a scale layer of the convolution neural network corresponding to learning tasks of the artificial intelligence processor; fusing the first training parameters of the batch norm layer, the first training parameters of the scale layer, and weight parameters of a convolution layer of the convolution neural network to obtain a first fusion result; fusing the second training parameters of the batch norm layer, the second training parameters of the scale layer, and bias parameters of the convolution layer of the convolution neural network to obtain a second fusion result; optimizing the convolution neural network according to the first fusion result and the second fusion result to obtain an optimized convolution neural network; and compiling the optimized convolution neural network to obtain a corresponding binary instruction, and distributing the binary instruction to the artificial intelligence processor for executing corresponding learning tasks.

It should be noted that the implementation steps for the processor to execute the computer program are similar to the implementation steps of the methods above, and are thus omitted here.

One of ordinary skill in the art can understand that the entire or part of the methods as stated in the examples may be carried out by in a way that a computer program instructs related hardware. The computer program may be stored in a nonvolatile computer readable storage medium. When the program is executed, the respective methods provided in the examples may be performed. Any reference to the memory, storage, database, or any other medium may include a nonvolatile and/or volatile memory, where the reference may be used in the examples provided in the present disclosure. The nonvolatile memory may include a ROM (Read Only Memory), a PROM (Programmable ROM), an EPROM (Electrically PROM), an EEPROM (Electrically Erasable PROM), or a flash memory. The volatile memory may include a RAM (Random Access Memory) or an external cache memory. By way of illustration and rather than limitation, the RAM may be obtained in various forms, such as a SRAM (Static RAM), a DRAM (Dynamic RAM), a SDRAM (Synchronous DRAM), a DDRSDRAM (Double Data Rate SDRAM), an ESDRAM (Enhanced SDRAM), a SLDRAM (Synchlink DRAM), a RDRAM (Rambus Direct RAM), a DRDRAM (Direct Rambus Dynamic RAM), and a RDRAM (Rambus Dynamic RAM).

The technical features in the above-mentioned examples may be combined randomly. For a brief description, not every possible combination of the technical features in the above-mentioned examples is described. However, combinations of these technical features shall be considered within the range of the description as long as they do not contradict to each other.

The following clauses would contribute to a better understanding of the preceding content.

A1, a learning task compiling method of artificial intelligence processors, including:

obtaining, by a general purpose processor, configuration parameters, where the configuration parameters include first training parameters and second training parameters of a scale layer of a convolution neural network corresponding learning tasks of an artificial intelligence processor;

fusing, by the general purpose processor, the first training parameters of the scale layer and weight parameters of a convolution layer of the convolution neural network to obtain a first fusion result;

fusing, by the general purpose processor, the second training parameters of the scale layer and bias parameters of the convolution layer of the convolution neural network to obtain a second fusion result;

optimizing, by the general purpose processor, the convolution neural network according to the first fusion result and the second fusion result to obtain an optimized convolution neural network; and compiling the optimized convolution neural network to obtain a corresponding binary instruction sequence, and distributing the binary instruction sequence to the artificial intelligence processor for executing corresponding learning tasks.

A2, the method of A1, where fusing, by the general purpose processor, the first training parameters of the scale layer and the weight parameters of the convolution layer of the convolution neural network to obtain the first fusion result includes:

multiplying, by the general purpose processor, the first training parameters of the scale layer by the weight parameters of the convolution layer to obtain the first fusion result.

A3, the method of A1, where fusing, by the general purpose processor, the second training parameters of the scale layer and the bias parameters of the convolution layer of the convolution neural network to obtain the second fusion result includes:

adding, by the general purpose processor, the second training parameters of the scale layer and the bias parameters of the convolution layer to obtain the second fusion result.

A4, the method of A1, where optimizing, by the general purpose processor, the convolution neural network according to the first fusion result and the second fusion result to obtain the optimized convolution neural network includes:

deleting, by the general purpose processor, the scale layer, changing the weight parameters of the convolution layer to the first fusion result, and changing the bias parameters of the convolution layer to the second fusion result.

A5, the method of A1, further including:

performing, by the general purpose processor, convolution computations on input data of the convolution layer and the first fusion result, and on the input data of the convolution layer and the second fusion result to obtain an output result of the convolution layer.

A6, the method of A5, where performing, by the general purpose processor, convolution computations on the input data of the convolution layer and the first fusion result, and on the input data of the convolution layer and the second fusion result to obtain an output result of the convolution layer includes:

multiplying, by the general purpose processor, the input data by the first fusion result to obtain a first operation result; and adding, by the general purpose processor, the first operation result and the second fusion result to obtain the output result.

A7, the method of A1, where the first training parameters of the scale layer include at least one first training sub-parameter for performing convolution computations of the scale layer, and the second training parameters of the scale layer include at least one second training sub-parameter for performing the convolution computations of the scale layer.

A8, a learning task compiling method of artificial intelligence processors, including:

obtaining, by a general purpose processor, configuration parameters, where the configuration parameters include first training parameters and second training parameters of a redundant layer of a convolution neural network corresponding learning tasks of an artificial intelligence processor;

fusing, by the general purpose processor, the first training parameters and weight parameters of a convolution layer of the convolution neural network to obtain a first fusion result;

fusing, by the general purpose processor, the second training parameters and bias parameters of the convolution layer of the convolution neural network to obtain a second fusion result;

optimizing the convolution neural network according to the first fusion result and the second fusion result to obtain an optimized convolution neural network; and compiling the optimized convolution neural network to obtain a corresponding binary instruction, and distributing the binary instruction to the artificial intelligence processor for executing corresponding learning tasks.

A9, a learning task compiling system of artificial intelligence processors, including a memory, a processor, and a computer program which is stored in the memory and is capable of running on the processor, where the processor implements the steps of the method of any of A1-A7 when executing the computer program.

A10, a computer readable storage medium, where a computer program is stored in the computer readable storage medium and implements the steps of the method in any of A1-A7 when a processor executes the computer program.

B1, a learning task compiling method of artificial intelligence processors, including:

obtaining, by a general purpose processor, first configuration parameters and second configuration parameters, where the first configuration parameters include first training parameters and second training parameters of a batch norm layer of the convolution neural network corresponding to the learning tasks of an artificial intelligence processor, and the second configuration parameters include first training parameters and second training parameters of a scale layer;

fusing, by the general purpose processor, the first training parameters of the batch norm layer, the first training parameters of the scale layer, and weight parameters of a convolution layer of the convolution neural network to obtain a first fusion result;

fusing, by the general purpose processor, the second training parameters of the batch norm layer, the second training parameters of the scale layer, and bias parameters of the convolution layer of the convolution neural network to obtain a second fusion result;

optimizing, by the general purpose processor, the convolution neural network according to the first fusion result and the second fusion result to obtain an optimized convolution neural network; and compiling the optimized convolution neural network to obtain a corresponding binary instruction sequence, and distributing the binary instruction sequence to the artificial intelligence processor for executing corresponding learning tasks.

B2, the method of B1, where fusing, by the general purpose processor, the first training parameters of the batch norm layer, the first training parameters of the scale layer, and the weight parameters of the convolution layer of the convolution neural network to obtain the first fusion result includes:

multiplying the first training parameters of the batch norm layer, the first training parameters of the scale layer, and the weight parameters of the convolution layer to obtain the first fusion result.

B3, the method of B1, where fusing, by the general purpose processor, the second training parameters of the batch norm layer, the second training parameters of the scale layer, and the bias parameters of the convolution layer of the convolution neural network to obtain the second fusion result includes:

adding the second training parameters of the batch norm layer, the second training parameters of the scale layer, and the bias parameters of the convolution layer to obtain the second fusion result.

B4, the method of B1, where optimizing, by the general purpose processor, the convolution neural network according to the first fusion result and the second fusion result to obtain the optimized convolution neural network includes:

deleting, by the general purpose processor, the batch norm layer and the scale layer, changing the weight parameters of the convolution layer to the first fusion result, and changing the bias parameters of the convolution layer to the second fusion result.

B5, the method of B1, further including:

performing, by the general purpose processor, convolution computations on input data of the convolution layer and the first fusion result, and on the input data of the convolution layer and the second fusion result to obtain an output result of the convolution layer.

B6, the method of A5, where performing, by the general purpose processor, convolution computations on the input data of the convolution layer and the first fusion result, and on the input data of the convolution layer and the second fusion result to obtain an output result of the convolution layer includes:

multiplying, by the general purpose processor, the input data by the first fusion result to obtain a first operation result; and adding, by the general purpose processor, the first operation result and the second fusion result to obtain the output result.

B7, the method of claim 1, where the first training parameters of the batch norm layer include at least one first training sub-parameter for performing convolution computations of the batch norm layer, and the second training parameters of the batch norm layer include at least one second training sub-parameter for performing the convolution computations of the batch norm layer.

B8, the method of B7, where if the first training parameters of the batch norm layer include a plurality of first training sub-parameters, includes: performing, by the general purpose processor, computations according to the plurality of first training sub-parameters to obtain a first intermediate operation result; and fusing the first intermediate operation result, the first training parameters of the scale layer, and the weight parameters of the convolution layer to obtain the first fusion result.

B9, the method of B7, where if the second training parameters of the batch norm layer include a plurality of second training sub-parameters, includes: performing, by the general purpose processor, computations according to the plurality of second training sub-parameters to obtain a second intermediate operation result; and fusing the second intermediate operation result, the second training parameters of the scale layer, and the bias parameters of the convolution layer to obtain the second fusion result.

B10, the method of B1, where the first training parameters of the scale layer include at least one first training sub-parameter for performing convolution computations of the scale layer, and the second training parameters of the scale layer include at least one second training sub-parameter for performing the convolution computations of the scale layer.

B11, a learning task compiling system of artificial intelligence processors, including a memory, a processor, and a computer program which is stored in the memory and is capable of running on the processor, where the processor implements the steps of the method of any of B1-B10 when executing the computer program.

B12, a computer readable storage medium, where a computer program is stored in the computer readable storage medium and implements the steps of the method in any of B1-B10 when a processor executes the computer program.

The above-mentioned examples are merely some examples of the present disclosure. The disclosure is described in a detailed way. Nonetheless, it should not be considered limiting of the scope of protection claimed by the present disclosure. It should be indicated that one of ordinary skill in the art may make some variations and improvements within the idea of the disclosure, and these variations and improvements are within the scope of protection claimed by the present disclosure. Therefore, the scope of protection claimed by the present disclosure shall be subject to the attached claims.

The invention claimed is:

1. A learning task compiling method of artificial intelligence processors, comprising:
   obtaining, by a general purpose processor, configuration parameters, wherein the configuration parameters include first training parameters and second training parameters of a batch norm layer,
      wherein the first training parameters at least include a scale, a variance, and an alpha of the batch norm layer, and
      wherein the second training parameters at least include the alpha, the scale, the variance, a mean, and a beta of the batch norm layer;
   dividing the alpha by a square root of a multiplication of the variance and the scale to obtain a first intermediate result;
   multiplying, by the general purpose processor, the first intermediate result of the first training parameters of the batch norm layer by the weight parameters of a convolution layer of a convolution neural network to obtain a first fusion result;
   subtracting a multiplication of the alpha, the mean, and a square root of a division result of the scale divided by the variance from the beta to obtain a second intermediate result;
   adding, by the general purpose processor, the second intermediate result of the second training parameters of the batch norm layer and bias parameters of the convolution layer to obtain a second fusion result;
   optimizing, by the general purpose processor, the convolution neural network to obtain an optimized convolution neural network according to the first fusion result and the second fusion result; and
   compiling the optimized convolution neural network to obtain a corresponding binary instruction sequence, and distributing the binary instruction sequence to an artificial intelligence processor for executing corresponding learning tasks.

2. The method of claim 1, wherein the optimizing the convolution neural network according to the first fusion result and the second fusion result includes:
   deleting, by the general purpose processor, the batch norm layer, changing the weight parameters of the convolution layer to the first fusion result, and changing the bias parameters of the convolution layer to the second fusion result.

3. The method of claim 1, further comprising:
   performing, by the general purpose processor, convolution computations on input data of the convolution layer and the first fusion result, and on the input data of the convolution layer and the second fusion result, to obtain an output result of the convolution layer.

4. The method of claim 3, wherein performing convolution computations on the input data of the convolution layer and the first fusion result, and on the input data of the convolution layer and the second fusion result, to obtain the output result of the convolution layer includes:
   multiplying, by the general purpose processor, the input data by the first fusion result to obtain a first operation result, and
   adding, by the general purpose processor, the first operation result and the second fusion result to obtain the output result.

5. The method of claim 1, wherein the first training parameters of the batch norm layer include at least one first training sub-parameter for performing convolution computations of the batch norm layer, and the second training parameters of the batch norm layer include at least one second training sub-parameter for performing the convolution computations of the batch norm layer.

* * * * *

UNITED STATES PATENT AND TRADEMARK OFFICE
CERTIFICATE OF CORRECTION

PATENT NO. : 12,400,125 B2
APPLICATION NO. : 16/719662
DATED : August 26, 2025
INVENTOR(S) : Xiaofu Meng, Hanzhao Zhu and Shaoli Liu Page 1 of 1

It is certified that error appears in the above-identified patent and that said Letters Patent is hereby corrected as shown below:

On the Title Page

Column 1, item [30] Foreign Application Priority Data:
Dec. 17, 2019 (CN).........................201811639927.4
Dec. 17, 2019 (CN).........................201811640027.1
Dec. 17, 2019 (CN).........................201811640762.2
Dec. 17, 2019 (CN).........................201911296834.0

Should read:
Dec. 29, 2018 (CN).........................201811639927.4
Dec. 29, 2018 (CN).........................201811640027.1
Dec. 29, 2018 (CN).........................201811640762.2
Dec. 16, 2019 (CN).........................201911296834.0

Signed and Sealed this
Seventh Day of October, 2025

John A. Squires
*Director of the United States Patent and Trademark Office*